US010167227B2

(12) United States Patent
Meng et al.

(10) Patent No.: US 10,167,227 B2
(45) Date of Patent: Jan. 1, 2019

(54) FIBERGLASS MATERIALS, METHODS OF MAKING, AND APPLICATIONS THEREOF

(71) Applicant: PPG Industries Ohio, Inc., Cleveland, OH (US)

(72) Inventors: Jian Meng, Gastonia, NC (US); Mike Fagg, Shelby, NC (US); John Rich, Allison Park, PA (US); Gordon N. Nameni, Menomonee Falls, WI (US); William Leehr, Winston-Salem, NC (US); Paul A. Westbrook, Lake Lure, NC (US)

( * ) Notice: Subject to any disclaimer, the term of this patent is extended or adjusted under 35 U.S.C. 154(b) by 0 days.

(21) Appl. No.: 15/229,937

(22) Filed: Aug. 5, 2016

(65) Prior Publication Data
US 2017/0044048 A1 Feb. 16, 2017

Related U.S. Application Data

(60) Provisional application No. 62/203,245, filed on Aug. 10, 2015, provisional application No. 62/239,504, filed on Oct. 9, 2015, provisional application No. 62/252,047, filed on Nov. 6, 2015, provisional application No. 62/252,096, filed on Nov. 6, 2015, provisional application No. 62/254,265, filed on Nov. 12, 2015.

(51) Int. Cl.
| | |
|---|---|
| *C03C 3/087* | (2006.01) |
| *C03C 13/00* | (2006.01) |
| *C03C 14/00* | (2006.01) |
| *C04B 14/22* | (2006.01) |
| *C03C 3/091* | (2006.01) |
| *C08K 3/40* | (2006.01) |
| *C09J 11/04* | (2006.01) |
| *C03C 1/00* | (2006.01) |
| *C09D 1/00* | (2006.01) |
| *C04B 28/02* | (2006.01) |
| *C04B 20/02* | (2006.01) |
| *C09D 7/40* | (2018.01) |
| *C08K 7/14* | (2006.01) |
| *C04B 103/00* | (2006.01) |

(52) U.S. Cl.
CPC .............. *C04B 14/22* (2013.01); *C03C 1/002* (2013.01); *C03C 3/087* (2013.01); *C03C 3/091* (2013.01); *C03C 13/00* (2013.01); *C03C 14/00* (2013.01); *C04B 20/026* (2013.01); *C04B 28/02* (2013.01); *C08K 3/40* (2013.01); *C09D 1/00* (2013.01); *C09D 7/69* (2018.01); *C09J 11/04* (2013.01); *C04B 2103/0088* (2013.01); *C08K 7/14* (2013.01); *Y02P 40/141* (2015.11); *Y02W 30/92* (2015.05); *Y02W 30/94* (2015.05)

(58) Field of Classification Search
CPC ......... C03C 13/00; C03C 13/087; C08K 7/14; C08J 5/043; C08J 5/044; C08J 5/08; B32B 17/02; B32B 17/04; B32B 17/10036; B32B 17/10174; B32B 17/06
See application file for complete search history.

(56) References Cited

U.S. PATENT DOCUMENTS

| | | | |
|---|---|---|---|
| 3,480,577 A | 11/1969 | Hallstrom, Jr. et al. | |
| 3,901,720 A | 8/1975 | Majumdar | |
| 4,309,334 A | 1/1982 | Valitsky | |
| 5,718,737 A | 1/1998 | Mosch | |
| 5,840,798 A | 11/1998 | Vollenberg et al. | |
| 6,344,081 B1 | 2/2002 | Pelot et al. | |
| 6,699,321 B2 | 3/2004 | Pelot et al. | |
| 6,776,838 B2 | 8/2004 | Hemmings et al. | |
| 7,070,131 B2 | 7/2006 | Hemmings et al. | |
| 7,413,602 B2 | 8/2008 | Grasso, Jr. et al. | |
| 7,605,098 B2 | 10/2009 | Hemmings et al. | |
| 7,775,466 B2 | 8/2010 | Grasso, Jr. et al. | |
| 7,811,377 B2 | 10/2010 | Hemmings et al. | |
| 7,931,220 B2 | 4/2011 | Grasso, Jr. et al. | |
| 8,209,999 B2 | 7/2012 | Schumacher et al. | |
| 2007/0112123 A1 | 5/2007 | Sekine | |
| 2007/0131145 A1* | 6/2007 | Biscan ................. | C04B 18/027 |
| | | | 106/600 |
| 2008/0009403 A1 | 1/2008 | Hofmann et al. | |
| 2009/0156385 A1* | 6/2009 | Biscan ................. | C03C 11/007 |
| | | | 501/32 |

(Continued)

FOREIGN PATENT DOCUMENTS

| | | | | |
|---|---|---|---|---|
| CN | 104910517 | | 9/2015 | |
| FR | 2968299 A1 * | | 6/2012 | ............. C03C 3/064 |
| WO | WO 2012/072700 | | 6/2012 | |

OTHER PUBLICATIONS

Patent Cooperation Treaty, International Search Report and Written Opinion, Application No. PCT/US16/54082 dated Dec. 13, 2016.

*Primary Examiner* — Elizabeth A. Bolden
(74) *Attorney, Agent, or Firm* — Kilpatrick Townsend & Stockton LLP

(57) ABSTRACT

Embodiments of the present invention described herein relate to fiberglass materials, composite glass materials, methods of making fiberglass materials and composite glass materials, and different applications of fiberglass materials and composite glass materials. The fiberglass materials can include a bimodal particle size distribution. The fiberglass materials can include an average aspect ratio of greater than about 2 to 1. Also described herein are composite glass materials including a first glass material and a second material. The second material can include at least one of post-consumer glass waste, fly ash, metakaolin, and slag. Also described herein are methods of making a composite glass material including providing a first glass material to a mixer; providing a second material to the mixer; and co-milling the first glass material and a second material to form a composite glass material.

9 Claims, 4 Drawing Sheets

(56) References Cited

U.S. PATENT DOCUMENTS

2010/0048790 A1\* 2/2010 Hart .................. C03C 17/28
                                                524/425
2014/0191448 A1\* 7/2014 Binhussain ........... C04B 41/80
                                                264/660

\* cited by examiner

FIBERGLASS MATERIALS, METHODS OF MAKING, AND APPLICATIONS THEREOF

CROSS REFERENCE TO RELATED APPLICATIONS

This application claims priority to U.S. Provisional Patent Application Ser. No. 62/203,245, filed on Aug. 10, 2015; U.S. Provisional Patent Application Ser. No. 62/239,504, filed on Oct. 9, 2015; U.S. Provisional Patent Application Ser. No. 62/252,047, filed on Nov. 6, 2015; U.S. Provisional Patent Application Ser. No. 62/252,096, filed on Nov. 6, 2015; and U.S. Provisional Patent Application Ser. No. 62/254,265, filed on Nov. 12, 2015, each of which is hereby incorporated by reference as though fully set forth herein.

FIELD OF INVENTION

The present invention relates generally to fiberglass materials, composite glass materials, methods of making fiberglass materials and composite glass materials, and different applications of fiberglass materials and composite glass materials.

BACKGROUND

Glass fibers and related materials have been used to reinforce and act as fillers to various materials for many years. In some instances, glass fibers have been used to reinforce different materials or serve as a filler for different applications. For example, different materials have been used to reinforce concrete materials. Some materials are referred to generally as pozzolans. Pozzolans are a siliceous material that do not possess any cementing property but chemically react with calcium hydroxide ($Ca(OH)_2$) in the presence of water to form compounds having cementitious properties.

Conventional pozzolans and fillers can have high costs of manufacture for materials with certain desired functional properties or, on the other hand, have inferior mechanical or chemical properties at a lower cost of manufacture. Thus, there is a need for improved fiberglass materials that have sufficient mechanical or chemical properties that can be manufactured at a commercially acceptable cost.

SUMMARY

In one aspect, particulate fiberglass materials are provided herein. In some embodiments, a waste fiberglass material can be reduced in size by different operations. In some such embodiments, the fiberglass material, having been reduced in size, can have a bimodal particle size distribution. In some such embodiments, the fiberglass material, having been reduced in size, can have an average aspect ratio of greater than 2 to 1. In some embodiments, the waste fiberglass material can be sized and formed into a powder form for use as a filler in different applications.

In another aspect, composite glass materials are provided herein. In some embodiments, a composite glass material comprises a particulate fiberglass material and a second material. In some embodiments, the particulate fiberglass material is co-milled with the second material to produce the composite glass material. In other embodiments, the particulate fiberglass material is mixed with the second material to produce the composite glass material. In some embodiments, the second material of the composite glass material comprises at least one of post-consumer glass waste, fly ash, metakaolin, and slag. In some embodiments, the composite glass materials are suitable for use as a filler in different applications.

In another aspect, methods of making composite glass materials are provided herein. In some embodiments, a method of making a composite glass material comprises providing a first glass material to a mixer; providing a second material to the mixer; and co-milling the first glass material and a second material to form a composite glass material.

In some embodiments, the second material comprises at least one of post-consumer glass waste, fly ash, metakaolin, and slag. In some embodiments, the second material comprises post-industrial waste glass. In some embodiments of the method, the second material comprises at least one of soda lime glass, float glass, plate glass, and flat glass.

In some embodiments, the fiberglass materials and/or composite glass materials can be used in a cement composition, an industrial and/or paint filler composition, in a resin filler composition, or in an adhesive composition, among other applications.

DETAILED DESCRIPTION

Figure 1:
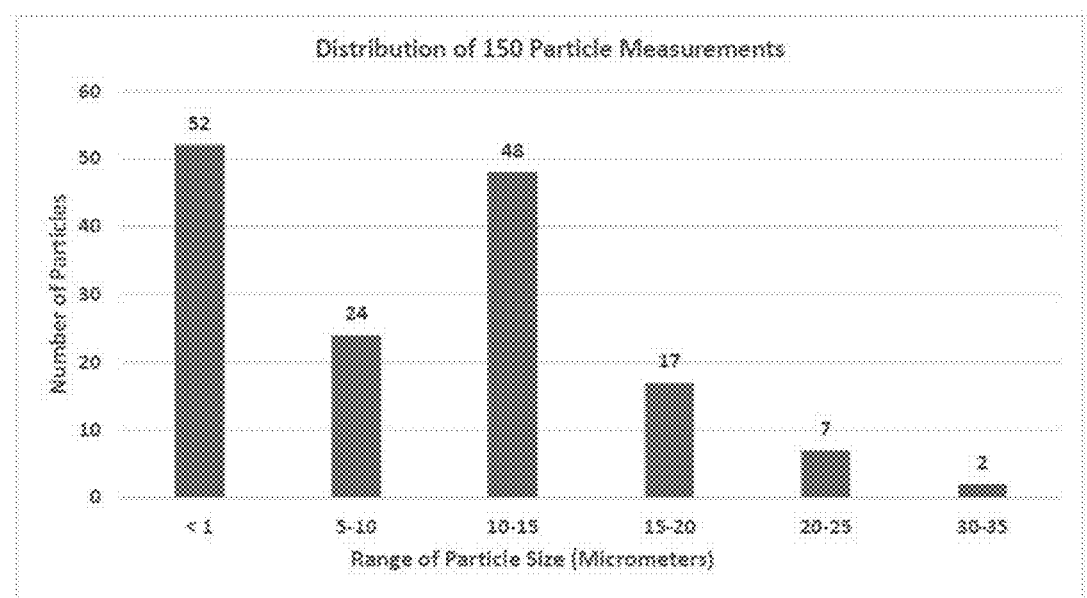
FIG. 1 is a chart showing a results of particle size analysis for particulate fiberglass material made according to an embodiment of the present invention.

The subject matter of embodiments of the present invention is described here with specificity to meet statutory requirements, but this description is not necessarily intended to limit the scope of future claims. The subject matter to be claimed may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. The illustrative examples are given to introduce the reader to the general subject matter discussed herein and not intended to limit the scope of the disclosed concepts. The following sections describe various additional embodiments and examples with reference to the drawings in which like numerals indicate like elements and directional description are used to describe illustrative embodiments but, like the illustrative embodiments, should not be used to limit the present invention.

Unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

The present invention relates generally to fiberglass materials, composite glass materials, methods of making fiberglass materials and composite glass materials, and different applications of fiberglass materials and composite glass materials. Applications may include use in cement compositions, industrial and paint compositions, resin filler compositions, and adhesive compositions, among other applications.

For purposes herein, "composite glass materials" are materials having at least one glass material, and at least one second material. The second material may be a second glass material or a non-glass material. The composite glass material may, in some cases, be created by co-milling at least one glass material with at least one second material or similar operations, as described in detail below, or may be created by mixing at least one glass material with at least one second material.

In some embodiments, the fiberglass materials can be manufactured from downchute waste generated during the manufacture of fiberglass. The waste fiberglass materials can be crushed, pulverized, milled, or otherwise sized such that the resulting fiberglass material comprises a bimodal particle size distribution and/or an average aspect ratio of greater than 2 to 1. In some embodiments, the fiberglass materials comprise a bimodal particle size distribution. The term "bimodal" refers to having or involving two modes, and particularly, having two distinct statistical modes. In some embodiments, the resulting fiberglass material comprises an average aspect ratio of greater than 2 to 1. In some cases, the fiberglass material may be co-milled or mixed with other materials, as described in more detail below.

Persons of ordinary skill in the art will recognize that the present invention can be implemented in connection with the production, assembly, and application of a number of glass fibers. Non-limiting examples of glass fibers and related waste material suitable for use in the present invention can include those prepared from fiberizable glass compositions such as "E-glass", "A-glass", "C-glass", "S-glass", "ECR-glass" (corrosion resistant glass), and fluorine and/or boron-free derivatives thereof. The composition of the glass material to be fiberized is not generally important to the present invention, and as such, embodiments of the present invention can be implemented in manufacturing processes for any number of fiberizable glass compositions.

Glass fibers can be formed from molten glass as will be discussed in more detail below. For example, glass fibers can be formed in a direct-melt fiber forming operation or in an indirect, or marble-melt, fiber forming operation. In a direct-melt fiber forming operation, raw materials are combined, melted and homogenized in a glass melting furnace. The molten glass moves from the furnace to a forehearth and into fiber forming apparatuses, such as bushings, where the molten glass is attenuated into continuous glass fibers. In a marble-melt glass forming operation, pieces or marbles of glass having the final desired glass composition are preformed and fed into a bushing where they are melted and attenuated into continuous glass fibers. If a premelter is used, the marbles are fed first into the premelter, melted, and then the melted glass is fed into a fiber forming apparatus, such as a bushing, where the glass is attenuated to form continuous fibers. For additional information relating to glass compositions and methods of forming the glass fibers, see K. Lowenstein, *The Manufacturing Technology of Continuous Glass Fibres*, (3d Ed. 1993), at pages 30-44, 47-103, and 115-165, which are specifically incorporated by reference herein.

In a typical direct-melt fiber forming operation, a glass melting furnace and forehearth convey a stream of molten fiberizable material to an outlet fitted with a metallic bushing attached to the bottom of the forehearth. The molten glass flows from the bottom of the bushing through a large number of orifices or "tips" in a tip plate where they can be attenuated by a winder to form glass filaments of desired size. The filaments can then be contacted with an applicator to apply a sizing composition, gathered by a guide to form a sliver or strand, and wound about a collet of a winder. Examples of suitable sizing compositions and winders are set forth in Loewenstein (supra) at pages 186-194 and 237-287. As sizing compositions are generally applied after formation of glass filaments, embodiments of the present invention can generally be implemented in manufacturing processes where any number of sizing compositions (or no sizing composition) are applied to the glass filaments, and the present invention is not intended to be limited to any particular sizing composition. Similarly, the present invention is not intended to be limited to manufacturing processes where any particular winder is used. As is known to those of skill in the art, winders are not required in all processes for forming fiberglass products as the glass fibers can be provided directly to other processing equipment.

During the above-described manufacturing processes, industrial downchute waste is generated during the fiber forming in the process. Downchute waste refers to glass material that is not converted to a final finished product and rejected as waste material during fiber forming. Sources of downchute waste can include waste from multiple locations in the manufacturing process as discussed further below. Typically, fiberglass manufacturing generates as much as 10 to 15 percent downchute waste, and sometimes as much as 20 percent downchute waste. Typically, this waste material is discarded or disposed of in landfills due to difficulty and high costs of post-processing of the material. The result is millions of pounds of downchute waste being sent to landfills each year in a typical fiber glass manufacturing site.

Some embodiments of the present invention can utilize and recycle the downchute waste fiberglass into different compositions useful in different applications. In some embodiments, the present invention utilizes the downchute waste material to provide a fiberglass material having properties advantageous for use in applications such as concrete or cement applications, industrial and paint filler applications, tiles and panel fillers, resin and material fillers, sealants and adhesives, and other uses. In some embodiments, the downchute glass may be mixed with other filler materials such as post-consumer waste glass, fly ash, clays such as metakaolin, and/or blast furnace slag. In some embodiments, the downchute waste fiberglass may be co-milled with one or more of these other filler materials.

I. Fiberglass Materials

In some embodiments, the waste fiberglass material can be reduced in size by different operations. In some such embodiments, the fiberglass material, having been reduced in size, can have a bimodal particle size distribution. In some such embodiments, the fiberglass material, having been reduced in size, can have an average aspect ratio of greater than 2 to 1. In some embodiments, the waste fiberglass material can be sized and formed into a powder form for use as a filler in different applications.

As provided above, the downchute waste material can include waste generated at different points in the manufacturing process. For example, downchute waste can include molten glass material that flows or drips from the bottom of the bushing orifices or tips in a tip plate. The downchute waste can also include fiber breakouts that occur as the glass filaments are attenuated by a winder. The downchute waste can also include glass fibers that have been wound about a spool, but are rejected, for example, due to the package being too small or not being a full spool of fiberglass or otherwise failing to meet manufacturing specifications. One of ordinary skill in the art appreciates other sources of downchute glass material waste can be included without departing from this spirit and scope of the present invention.

Such downchute waste can include glass material having a consistent chemical composition that can provide predictable and advantageous properties, for example, in use as a filler in different applications. For example, the downchute waste can comprise fiberizable glass compositions characteristic of "E-glass", "A-glass", "C-glass", "S-glass", or "ECR-glass."

In some embodiments, the downchute fiberglass waste material can be collected from the manufacturing operations and further processed to provide a fiberglass material comprising a bimodal particle size distribution. In some embodiments, the downchute fiberglass waste material can be collected from the manufacturing operations and further processed to provide a fiberglass material comprising a plurality of particles having an average aspect ratio of greater than about 2 to 1.

In some embodiments, the downchute fiberglass waste material can be pulverized, crushed, or otherwise be processed by a sizing operation. Different pulverizing or sizing operations understood by one of ordinary skill in the art can be utilized to generate the particulate fiberglass material. For example, the pulverizing or sizing operation can include at least one of chopping, grinding, crushing, shredding, cutting, and milling. The pulverizing or sizing operation may include sub-operations, for example a shredding, sorting, grinding, drying, and/or other cutting operations. In some embodiments, the fiberglass waste material can be cut or shredded to reduce the length of the fibers in the downchute waste prior to being pulverized, crushed, or otherwise sized. In other embodiments, the fiberglass waste material can be provided directly to a pulverizing, crushing, or sizing operation without being cut to reduce the length of fibers.

In some embodiments, the particulate fiberglass material can be characterized by a particle size distribution. The particulate fiberglass material having been reduced in size can comprise a bimodal particle size distribution. In some embodiments, the particulate fiberglass material can comprise a bimodal particle size distribution comprising a first mode having a particle size from about 5 microns to about 30 microns and a second mode having a particle size from about 10 microns to about 50 microns. In some embodiments, the particulate fiberglass material can comprise a bimodal particle size distribution comprising a first mode having a particle size at about 4 microns and a second mode having a particle size at about 10 microns. In other embodiments, the particulate fiberglass material can comprise a bimodal particle size distribution comprising a first mode having a particle size at about 10 microns±50 microns and a second mode having a particle size between about 400 microns±50 microns. In other embodiments, the particulate fiberglass material can comprise a bimodal particle size distribution comprising a first mode having a particle size at about 100 microns±50 microns and a second mode having a particle size between about 400 microns±50 microns. In other embodiments, the particulate fiberglass material can comprise a bimodal particle size distribution comprising a first mode having a particle size at about 150 microns±50 microns and a second mode having a particle size between about 400 microns±50 microns.

In other embodiments, the particulate fiberglass material can comprise a bimodal particle size distribution comprising a first mode having a particle size between about 1 micron to about 3 microns and a second mode having a particle size between about 10 microns to about 12 microns. In yet other embodiments, the particulate fiberglass material can comprise a bimodal particle size distribution comprising a first mode having a particle size at about 6 microns to about 8 microns and a second mode having a particle size between about 28 microns to about 32 microns. In yet further embodiments, the particulate fiberglass material can comprise a bimodal particle size distribution comprising a first mode having a particle size between about 4 microns to about 6 microns and a second mode having a particle size between about 18 microns to about 21 microns. In yet other embodiments, the particulate fiberglass material can comprise a bimodal particle size distribution comprising a first mode having a particle size at about 100 microns±50 microns and a second mode having a particle size between about 400 microns±50 microns, as measured by cross-section Scanning Electron Microscopy (SEM), as described more fully in Example 1, below.

In some embodiments, the particulate fiberglass material can have a particle size of less than about 45 microns. In some embodiments, the particulate fiberglass material can have a particle size of −325 mesh. In some embodiments, the particulate fiberglass material can have a particle size of −400 mesh. In some embodiments, the particulate fiberglass material can have a particle size of less than about 1 mm.

In some embodiments, the particulate fiberglass material can comprise a bimodal particle size distribution with between about 20% to 50% having a particle size of less than about 5 microns and between about 20% to about 50% having a particle size between about 10 microns to about 15 microns. In some embodiments, the particulate fiberglass material can comprise a bimodal particle size distribution with between about 20% to 50% having a particle size of from about 5 microns to about 30 microns and between about 20% to about 50% having a particle size from about 10 microns to about 50 microns. In some embodiments, the particulate fiberglass material can comprise a bimodal particle size distribution having a first mode having a particle size of from about 5 microns to about 30 microns and a second mode having a particle size from about 10 microns to about 50 microns. In some embodiments, the particulate fiberglass material can comprise a bimodal particle size distribution with between about 20% to 40% having a particle size of less than about 1 microns and from about 20% to about 40% having a particle size from about 10 microns to about 15 microns.

In some embodiments, the particulate fiberglass material can be characterized by its average aspect ratio. The aspect ratio refers to the length of the particle divided by the diameter or width of the particles. In some embodiments, the particulate fiberglass material can have a high aspect ratio. In some embodiments, the particulate fiberglass material can have an average aspect ratio of greater than 2 to 1. In some embodiments, the average aspect ratio of the particulate fiberglass material is greater than 2.5 to 1, and in some embodiments, greater than 3 to 1, and in some embodiments, greater than 4 to 1.

In some embodiments, the present invention comprises a method of making a particulate fiberglass material. In some embodiments, the method comprises providing downchute fiberglass waste and reducing the size of the fiberglass waste to generate a particulate fiberglass material, wherein the particulate fiberglass material comprises a bimodal particle size distribution. In some embodiments, the particulate fiberglass material made according to methods described herein can have an average aspect ratio of greater than 2 to 1. In some embodiments, the particulate fiberglass material comprising a bimodal particle size distribution comprises a plurality of particles having an average aspect ratio of greater than 2 to 1.

Figure 2:
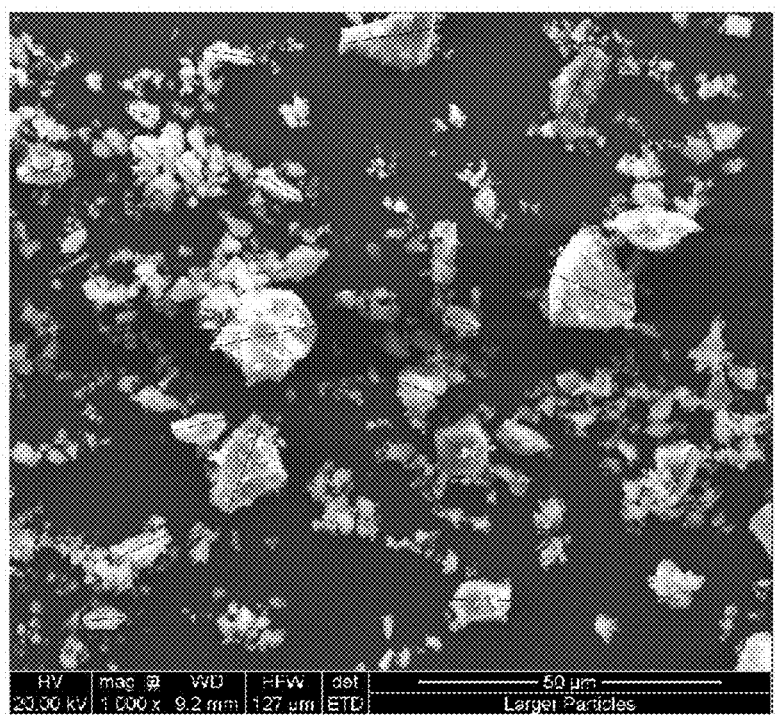
FIG. 2 is an SEM image of particulate fiberglass material made according to an embodiment of the present invention.
Figure 3:
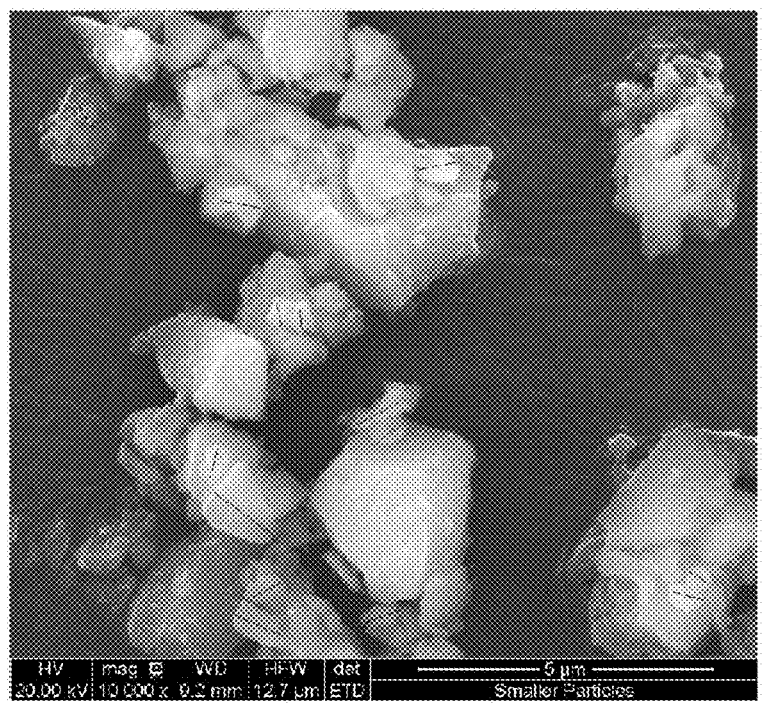
FIG. 3 is an SEM image of particulate fiberglass material made according to an embodiment of the present invention.
Figure 4:
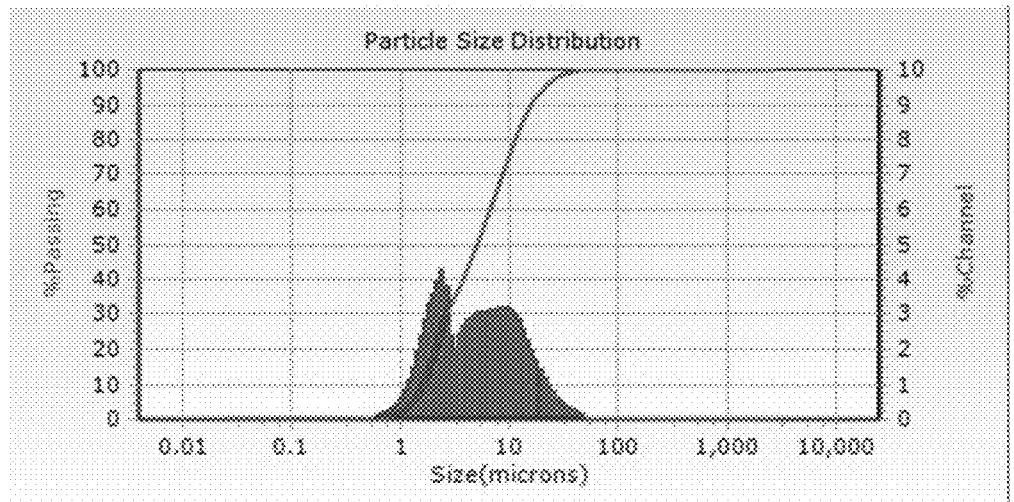
FIG. 4 is a chart showing a results of particle size analysis for particulate fiberglass material made according to an embodiment of the present invention.
Figure 5:
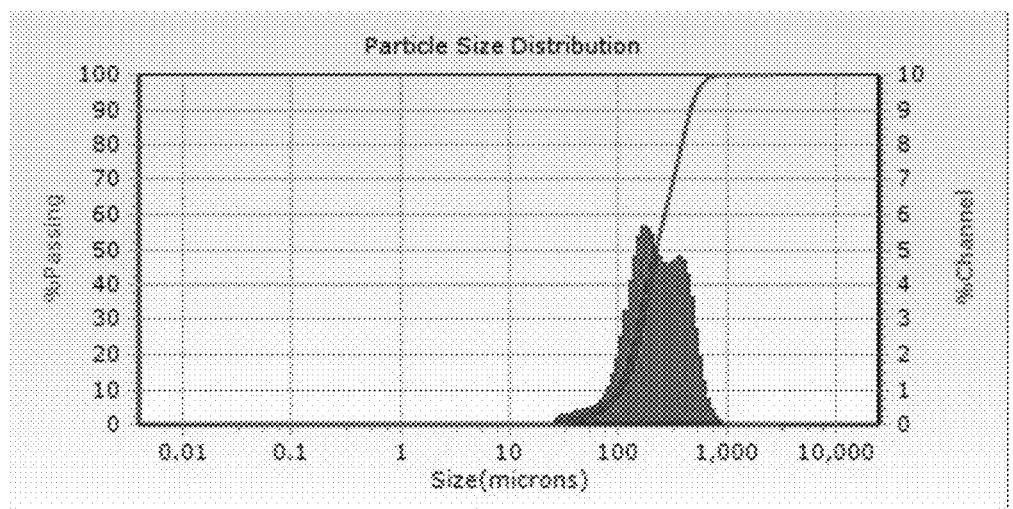
FIG. 5 is a chart showing a results of particle size analysis for particulate fiberglass material made according to an embodiment of the present invention.

Turning to the figures, FIG. 1 is a bar graph of the particle size distribution of particulate fiberglass material for measurements from 150 particles according to one embodiment. FIG. 2 is an SEM image at 1,000× magnification of particulate fiberglass material according to one embodiment. FIG. 3 is an SEM image particulate fiberglass material at 10,000× magnification according to one embodiment. FIG. 4 shows the distribution of a particle size analysis of particulate fiberglass materials having a bimodal particle size distribution prepared according to methods of embodiments of the present invention, as described further below in the Examples section. The first peak shown in FIG. 4 is about 1.987 μm, and the second peak shown in FIG. 4 is about 8.06 μm. FIG. 5 shows the distribution of a particle size analysis of particulate fiberglass materials having a bimodal particle size distribution prepared according to methods of embodiments of the present invention as described further below in the Examples section.

II. Composite Glass Materials

In some embodiments, the downchute fiberglass waste material can be particulate, crushed, or otherwise be processed by a sizing operation, as described herein. In some embodiments, the particulate fiberglass material can be further processed and/or mixed with other materials to create a composite glass material.

In some embodiments, the particulate fiberglass material comprising a bimodal particle size distribution further comprises a second material. In some embodiments, the particulate fiberglass material comprising a bimodal particle size distribution is mixed with the second material. In some embodiments, the particulate fiberglass material comprising a bimodal particle size distribution is co-milled with the second material. In some embodiments, the particulate fiberglass material comprising a bimodal particle size distribution is co-milled with the second material, wherein the second material comprises at least one of post-consumer glass waste, fly ash, a natural clay, and slag.

In some embodiments, the particulate fiberglass material comprising a plurality of particles having an average aspect ratio of greater than 2 to 1 further comprises a second material. In some embodiments, the particulate fiberglass material a plurality of particles having an average aspect ratio of greater than 2 to 1 is mixed with the second material. In some embodiments, the particulate fiberglass material a plurality of particles having an average aspect ratio of greater than 2 to 1 is co-milled with the second material. In some embodiments, the particulate fiberglass material a plurality of particles having an average aspect ratio of greater than 2 to 1 is co-milled with the second material, wherein the second material comprises at least one of post-consumer glass waste, fly ash, a natural clay such as metakaolin, and slag.

In some embodiments, a composite glass material comprises a particulate fiberglass material and a second material. In some embodiments, the particulate fiberglass material is co-milled with the second material to produce the composite glass material. In other embodiments, the particulate fiberglass material is mixed with the second material to produce the composite glass material. In some embodiments, the second material of the composite glass material comprises at least one of post-consumer glass waste, fly ash, a natural clay such as metakaolin, and slag.

Certain aspects of the present invention will now be discussed in connection with FIG. 6, which illustrates some embodiments of the present invention. Although the description associated with the Figure will focus on embodiments shown in the Figure, it should be understood that only slight modifications need to be made to the components in order to provide composite milled materials embodying the inventive concepts described in this application.

Figure 6:
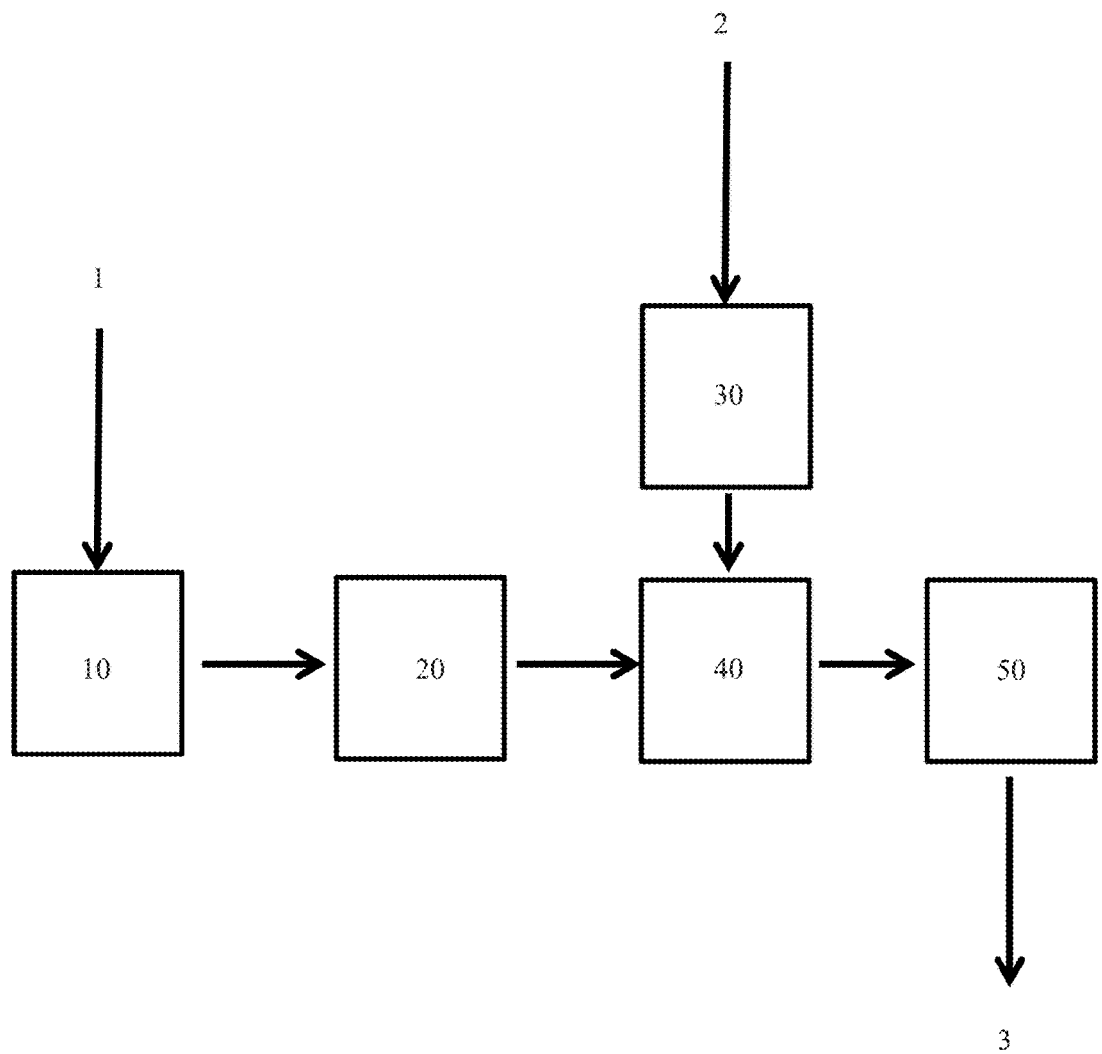
FIG. 6 is a chart showing a co-milling operation for composite glass material made according to an embodiment of the present invention.

FIG. 6 shows a schematic block diagram of an exemplary method of making a composite milled material. A glass material 1 is provided to a sizing operation 10 where the first glass material is sorted and sized to a predetermined size. Different sizing operations understood by one of ordinary skill in the art can be utilized to generate a substantially uniform sized first glass material. For example, the sizing operation 10 can include at least one of chopping, grinding, crushing, shredding, cutting, and milling. The sizing operation 10 may include sub-operations, for example a shredding, sorting, grinding, drying, and/or other cutting operations. The glass material can be provided as post-industrial waste, for example as a downchute waste product that is further processed into a substantially uniform first glass material. After the sizing operation 10, the glass material proceeds to a inline scale 20. Upon being weighed and further processed at the inline scale 20, an amount of the glass material enters a mixer 40 where it is mixed with a second glass material 2.

In some embodiments, the glass material 1 can be provided directly to a mixer, for example, mixer 40, without any sizing operation. In some such embodiments, the first glass material 1 can be downchute waste from a fiberglass manufacturing operation that does not require any further sizing operation prior to being provided to a mixer. In some embodiments, at the introduction to the mixer 40, the glass material can have a particle size of greater than about 45 microns. In some embodiments, at the introduction to the mixer 40, the glass material can have a particle size of +325 mesh. In some embodiments, at the introduction to the mixer 40, the first material can have a particle size of −1 inch mesh, and in some embodiments, a particle size of −¼ inch mesh.

In yet other embodiments, the glass material, for example, as downchute waste glass, can be provided to the mixer at the size exiting a manufacturing operation. In yet other embodiments, the maximum size of the glass material can be determined by the dimensions of the downstream equipment, for example, the mixer or the co-milling equipment.

A second material 2 is provided to the system. The second material 2 can be sized, chopped, grinded, crushed, and/or sorted by techniques known to those of ordinary skill in the art. In some embodiments, the second material 2 can be supplied to the process in a pre-sized form. The second material 2 is provided to an inline scale 30. Upon being weighed and further processed at the inline scale 30, an amount of the second material enters the mixer 40.

In some embodiments, at the introduction to the mixer 40, the second material can have a particle size of greater than about 175 microns. In some embodiments, at the introduction to the mixer 40, the second material can have a particle size of +80 mesh. In some embodiments, at the introduction to the mixer 40, the second material can have a particle size of −3/8 inch mesh. In yet other embodiments, the maximum size of the second material can be determined by the dimensions of the downstream equipment, for example, the mixer or the co-milling equipment.

The mixer 40 mixes the glass material and the second material to provide a substantially uniform blend of the glass material and the second material. The substantially uniform blend of the glass material and the second material is then transferred to a milling operation 50. The milling operation 50 co-mills the two starting materials to form a substantially homogeneous composite. The milling operation 50 can include one milling operation or a plurality of milling operations. For example, the milling operation 50 can include at least one of an impact miller, trough miller, air classification system, and other operations known to those of ordinary skill in the art. A composite glass material 3 then exits the milling operation 50.

In some embodiments, the composite glass material 3 can have a particle size of less than about 45 microns. In some embodiments, the composite glass material 3 can have a particle size of −325 mesh. In some embodiments, the composite glass material 3 can have a particle size of −400 mesh.

One of ordinary skill in the art would understand that additional equipment can be included to increase the throughputs necessary to meet any desired production levels.

The milling operation can co-mill different-sized glass materials and second materials. For example, in some embodiments, the milling operation can co-mill a downchute waste fiberglass that has not been sized or chopped with a second material that has not been otherwise milled, sized, or chopped. In other embodiments, the milling operation can co-mill a downchute waste fiberglass that has been sized or chopped with a second material that has not been otherwise milled, sized, or chopped. In yet other embodiments, the milling operation can co-mill a downchute waste fiberglass that has not been sized or chopped with a second material that has been milled, sized, or chopped. In yet other embodiments, the milling operation can co-mill a downchute waste fiberglass that has been sized or chopped with a second material that has been sized or chopped. As one of ordinary skill in the art would understand, each of the starting materials can be sized or otherwise processed (e.g., chopped, grinded, crushed, shredded, cut, and milled), or not sized or otherwise processed, prior to providing the starting materials to the system to form a composite glass material.

In some embodiments, the second material comprises pozzolanic materials, for example, but not to be considered limiting, post-consumer waste glass, fly ash, clay materials such as metakaolin, and/or slag. In some embodiments, the second material is post-consumer waste glass material, for example soda lime glass. In some embodiments, the second material comprises at least one of soda lime glass, float glass, flat glass, plate glass, and CRT glass. In some embodiments, the second material comprises fly ash, metakaolin, or slag. The composite glass materials comprising a fiberglass material and a second material are described in more detail below.

A. A Fiberglass Material Co-Milled with Other Glass Waste

In some embodiments, the particulate fiberglass material can be processed and/or mixed with post-consumer glass waste, such as bottle glass, soda lime glass, optical glass, float glass, flat glass, plate glass, or CRT glass, to make up a filler material. In some embodiments, the particulate fiberglass material comprising a bimodal particle size distribution can be co-milled with a second material. In some embodiments, the particulate fiberglass material comprising an aspect ratio greater than 2:1 can be co-milled with a second material. In other embodiments, the particulate fiberglass material that is co-milled with a second material does not comprise a bimodal particle size distribution and/or does not comprise an aspect ratio greater than 2:1.

In some aspects, the composite glass material utilizes different waste or recycled glass materials or siliceous materials with high alkali content, for example, nephylene syenite.

Some embodiments of the present invention can be characterized by the total amount of $Na_2O$ present in the composite glass material. In some embodiments, the composite glass material of the present invention can comprise between about 2.1 and about 8.2 weight percent $Na_2O$, and in some embodiments, between about 2.1 and about 8.0 weight percent $Na_2O$. $Na_2O$ can be present, in some embodiments, in an amount between about 0.1 and about 0.9 weight percent. In some embodiments, $Na_2O$ can be present in an amount between about 8.0 and about 18.5 weight percent.

In some embodiments, the composite glass material of the present invention can comprise between about 55 and about 70 weight percent $SiO_2$. $SiO_2$ can be present, in some embodiments, in an amount between about 66.0 and about 88.0 weight percent. In some embodiments, $SiO_2$ can be present in an amount between about 52.0 and about 60.0 weight percent.

In some embodiments, the composite glass material of the present invention can comprise between about 5.0 and about 15.0 weight percent $Al_2O_3$. $Al_2O_3$ can be present, in some embodiments, in an amount between trace amounts and about 7.0 weight percent. In some embodiments, $Al_2O_3$ can be present in an amount between about 10 and about 15 weight percent.

In some embodiments, the composite glass material of the present invention can comprise between about 15 and about 20 weight percent CaO. CaO can be present, in some embodiments, in an amount between trace amounts and about 15.0 weight percent. In some embodiments, CaO can be present in an amount between about 21.0 and about 23.0 weight percent.

In some embodiments, the composite glass material of the present invention can comprise between about 1.0 and about 5.0 weight percent MgO. MgO can be present, in some embodiments, in an amount between about 1.0 and about 3.0 weight percent. In some embodiments, MgO can be present in an amount between about 4.0 and about 5.0 weight percent.

In some embodiments, the composite glass material of the present invention can comprise less than about 0.4 weight percent $K_2O$. $K_2O$ can be present, in some embodiments, in an amount less than about 0.2 weight percent. In some embodiments, $K_2O$ can be present in an amount less than about 0.1 weight percent.

In some embodiments, the composite glass material of the present invention can comprise less than about 1.0 weight percent $Fe_2O_3$. $Fe_2O_3$ can be present, in some embodiments, in an amount less than about 0.3 weight percent. In some embodiments, $Fe_2O_3$ can be present in an amount less than about 0.5 weight percent.

In some embodiments, the composite glass material of the present invention can comprise less than about 0.12 weight percent $Cr_2O_3$. $Cr_2O_3$ can be present, in some embodiments, in an amount less than about 0.10 weight percent. In some embodiments, $Cr_2O_3$ can be present in an amount less than about 0.01 weight percent.

In some embodiments, the composite glass material of the present invention can comprise less than about 2.5 weight percent $TiO_2$. $TiO_2$ can be present, in some embodiments, in an amount less than about 1.0 weight percent. In some embodiments, $TiO_2$ can be present in an amount less than about 0.6 weight percent.

In some embodiments, the composite glass material of the present invention can comprise less than about 0.2 weight percent $SO_3$. $SO_3$ can be present, in some embodiments, in an amount less than about 0.1 weight percent. In some embodiments, $SO_3$ can be present in an amount less than about 0.01 weight percent.

In some embodiments, the composite glass material of the present invention can comprise between about 0.5 and about 2.0 weight percent $B_2O_3$. $B_2O_3$ can be present, in some embodiments, in an amount between about 1.0 and about 2.0 weight percent. In some embodiments, $B_2O_3$ can be present in an amount between about 4.0 and about 6.0 weight percent. In some embodiments, the composite glass material of the present invention can comprise less than about 0.5 weight percent SrO. SrO can be present, in some embodiments, in an amount less than about 0.3 weight percent.

In some embodiments, the composite glass material of the present invention can comprise less than about 0.5 weight percent BaO. BaO can be present, in some embodiments, in an amount less than about 0.2 weight percent. In some embodiments, the composite glass material of the present invention can comprise less than about 0.2 weight percent $ZrO_2$. $ZrO_2$ can be present, in some embodiments, in an amount less than about 0.03 weight percent. In some embodiments, the composite glass material can include less than about 0.01 weight Cl. As one of ordinary skill in the art would appreciate, the composite glass materials can include impurities and trace amounts of other materials. The composite glass material can include various combinations of the above listed materials at different amounts.

In some exemplary embodiments, the composite glass material comprises about 55 to about 70 weight percent $SiO_2$; about 5 to about 11 weight percent $Al_2O_3$; about 15 to about 20 weight percent of CaO; about 1 to 3 weight percent MgO; about 2.1 to about 8.0 weight percent $Na_2O$; and less than about 0.2 weight percent of $K_2O$.

In further embodiments, the composite glass material further comprises less than about 0.3 weight percent $Fe_2O_3$; less than about 0.01 $Cr_2O_3$; less than about 0.6 weight percent $TiO_2$; less than about 0.1 weight percent $SO_3$; about 0.5 to about 2.0 weight percent $B_2O_3$; less than about 0.3 weight percent SrO; less than about 0.2 weight percent BaO; and less than about 0.03 weight percent $ZrO_2$.

In some embodiments, the composite glass material can include a wider range of alkali within the material than conventional fillers. For example, conventional E-glass chemistry includes $Na_2O$ levels less than 1 weight percent. As another example, conventional soda lime glass includes $Na_2O$ levels greater than 8 weight percent. In certain aspects, the present invention includes a $Na_2O$ level of between about 2.1 to about 8.2 weight percent and exhibit properties characteristic of E-glass chemistry but having a higher alkali content.

In some embodiments, the present invention comprises a method of making a composite glass material. In some embodiments, the method comprises providing a first glass material into a mixer; providing a second glass material into the mixer; and co-milling the first glass material and the second glass material to form a composite glass material.

In some embodiments, the present invention comprises a method of making a composite glass material. In some embodiments, the method comprises providing a first glass material; chopping the first glass material; providing a second glass material; mixing the chopped first glass material with the second glass material to provide a blend of the chopped first glass material and the second glass material; and milling the blend of the chopped first glass material and the second glass material to form a composite glass material.

In some embodiments, the method of making a composite glass material comprises making a composite glass material between about 2.1 to about 8.2 weight percent of $Na_2O$, and in some embodiments, about between about 2.1 to about 8.0 weight percent $Na_2O$. In some embodiments, the first glass material is at least one of E-glass, A-glass, C-glass, D-glass, S-glass, and ECR-glass compositions. In some embodiments, the first glass material is characterized as having an E-glass composition. In some embodiments, the first glass material is industrial waste glass.

In some embodiments, the second glass material is at least one of soda lime glass, float glass, flat glass, plate glass, and CRT glass. In some embodiments, the second glass material is post-consumer waste glass. In some embodiments, the second glass material comprises siliceous materials with high alkali content. In some embodiments, the second glass material comprises nephylene syenite.

In certain aspects of the present invention, the composite glass material can be used in concrete-related applications. In some such applications, the composite glass material can provide equivalent or improved properties as compared to conventional pozzolans, such as, for example, compressive strength activity index or shrinkage resistance.

Referring back to FIG. 6, the second glass material 2 is provided to the system. In some embodiments, the second glass material 2 is post-consumer glass material, for example soda lime glass. In some embodiments, the second glass material comprises at least one of soda lime glass, float glass, flat glass, plate glass, and CRT glass. The second glass material 2 can be sized, chopped, grinded, crushed, and/or sorted by techniques known to those of ordinary skill in the art. In some embodiments, the second glass material 2 can be supplied to the process at in pre-sized form. The second glass material 2 is provided to a inline scale 30. Upon being weighed and further processed at the inline scale 30, an amount of the second glass material enters the mixer 40.

In some embodiments, at the introduction to the mixer 40, the second glass material can have a particle size of greater than about 175 microns. In some embodiments, at the introduction to the mixer 40, the second glass material can have a particle size of +80 mesh. In some embodiments, at the introduction to the mixer 40, the second glass material can have a particle size of −⅜ inch mesh. In yet other embodiments, the maximum size of the second glass material can be determined by the dimensions of the downstream equipment, for example, the mixer or the co-milling equipment.

The mixer 40 mixes the first glass material and the second glass material to provide a substantially uniform blend of the first glass material and the second glass material. The substantially uniform blend of the first glass material and the second glass material is then transferred to a milling operation 50. The milling operation 50 co-mills the two starting materials to form a substantially homogeneous composite. The milling operation 50 can include one milling operation or a plurality of milling operations. For example, the milling operation 50 can include at least one of an impact miller, trough miller, air classification system, and other operations known to those of ordinary skill in the art. A composite glass material 3 then exits the milling operation 50.

In some embodiments, the composite glass material 3 can have a particle size of less than about 45 microns. In some embodiments, the composite glass material 3 can have a particle size of −325 mesh. In some embodiments, the composite glass material 3 can have a particle size of −400 mesh.

One of ordinary skill in the art would understand that additional equipment can be included to increase the throughputs necessary to meet any desired production levels.

The milling operation can co-mill different-sized first glass materials and second glass materials. For example, in some embodiments, the milling operation can co-mill a downchute waste fiberglass that has not been sized or chopped with a second glass material that has not been otherwise sized or chopped. In other embodiments, the milling operation can co-mill a downchute waste fiberglass that has been sized or chopped with a second glass material that has not been otherwise sized or chopped. In yet other embodiments, the milling operation can co-mill a downchute waste fiberglass that has not been sized or chopped with a second glass material that has been sized or chopped. In yet other embodiments, the milling operation can co-mill a downchute waste fiberglass that has been sized or chopped with a second glass material that has been sized or chopped. As one of ordinary skill in the art would understand, each of the starting materials can be sized or otherwise processed (e.g., chopped, grinded, crushed, shredded, cut, and milled), or not sized or otherwise processed, prior to providing the starting materials to the system to form a composite glass material.

Conventional filler products utilizing post-consumer glass waste, including waste glass sometimes referred to as soda lime glass or bottle glass, can have certain disadvantages as compared to some embodiments of the present invention. For example, post-consumer bottle glass can include high alkali content that may help reduce alkali silicate reactions in a pozzolan-reinforcement application. However, the long-term viability of structures with high amounts of alkalis within the conventional pozzolans may problematic as the high alkali content may weaken the structure integrity of the associated concrete structures and accelerate or exacerbate the mechanical failure of the concrete structure. In an industrial and paint filler application, conventional pozzolans using post-consumer bottle glass can have high variability in the chemistry and color of the glass stock used. In some conventional applications, the inherent variation in the conventional post-consumer milled glass can lead to problems controlling tint or hiding, which may affect the "whiteness" level of certain paint products.

The composite glass material according to certain aspects described herein may provide a viable alternative to pozzolans with high alkali content and pozzolans with purely E-glass chemistry. In some aspects, the composite glass material can comprise a composition that includes a sufficiently high silica and alumina content necessary to drive a pozzolanic reaction, but contains amounts of other components retrieved from other waste glass sources that can offset costs while aid in targeting specific performance requirements. For example, the composite glass materials according to embodiments described herein can provide improved workability, improved water tightness, improved resistance to adverse chemical reactions, higher mechanical strength, increased durability, decreased permeability, reduced sulfate attack, reduced shrinkage, reduced volume, reduced heat of hydration, reduced alkali silicate reactions, and reduced segregation. In some embodiments, these properties can be achieved through use of the composite glass materials described herein at a lower cost than conventional pozzolans by using different waste glass materials. Embodiments of the present invention can achieve full pozzolanic reactivity without the potentially detrimental outcome that may arise from usage of glass with high alkali, for example, in concrete.

In certain aspects of the present invention, the composite glass material can be used in concrete-related applications. In some such applications, the composite glass material can provide equivalent or improved properties as compared to conventional pozzolans, such as, for example, compressive strength activity index, shrinkage resistance.

B. A Fiberglass Material Co-Milled with a Fly Ash Material

In some embodiments, the composite glass material is made from at least one of a post-industrial waste material, for example, a fly ash material. The fly ash material includes by-products of burning coal in an electrical generating station. In some embodiments, the fly ash material can be classified as Class F, Class C, or Class N as set forth in the specifications provided in ASTM C618.

In some embodiments, the composite glass material can be used as a filler product for use in concrete or cement applications, industrial and paint filler applications, tiles and panel fillers, resin and material fillers, sealants and adhesives, and other uses.

Some embodiments of the present invention can be characterized by the total amount of $SiO_2$, $Al_2O_3$, and $Fe_2O_3$ present in the composite glass material. In some embodiments, the composite glass material of the present invention can comprise between about 50 weight percent and about 85 weight percent $SiO_2$, $Al_2O_3$, and $Fe_2O_3$. The total amount of $SiO_2$, $Al_2O_3$, and $Fe_2O_3$ can be present, in some embodiments, in an amount between about 40 weight percent to about 50 weight percent. In some embodiments, the total amount of $SiO_2$, $Al_2O_3$, and $Fe_2O_3$ can be present in an amount between about 50 weight percent to about 75 weight percent of the total composite glass material.

In some embodiments, the composite glass material of the present invention can comprise between about 6.0 weight percent and about 28 weight percent $CaO$. $CaO$ can be present, in some embodiments, in an amount between about 6.5 weight percent to about 21.5 weight percent. In some embodiments, $CaO$ can be present in an amount between about 10.0 weight percent to about 20.0 weight percent of the total composite glass material. In some embodiments, CaO can be present in an amount between about 15.0 weight percent to about 28.0 weight percent of the total composite glass material.

In some embodiments, the composite glass material of the present invention can comprise between about 0.5 weight percent and about 5.0 weight percent MgO, and in some embodiments, between about 0.1 weight percent and about 5.0 weight percent MgO. MgO can be present, in some embodiments, in an amount between about 0.8 weight percent to about 4.0 weight percent. In some embodiments, MgO can be present in an amount between about 1.0 weight percent to about 3.5 weight percent of the total composite glass material. In some embodiments, MgO can be present in an amount between about 2.0 weight percent to about 5.0 weight percent of the total composite glass material.

In some embodiments, the composite glass material of the present invention can comprise between about 0.1 weight percent to about 2.5 weight percent $SO_3$. $SO_3$ can be present, in some embodiments, between about 0.1 weight percent to about 2.0 weight percent. In some embodiments, $SO_3$ can be present between about 0.1 weight percent to about 1.5 weight percent of the total composite glass material.

In some embodiments, the composite glass material of the present invention can comprise between about 0.1 weight percent to about 18.0 weight percent of total alkali content. The total alkali content can include $Na_2O$ and $K_2O$. The total alkali content, in some embodiments, can comprise between about 0.1 weight percent to about 2.0 weight percent. In some embodiments, the total alkali content can be between about 2.1 weight percent to about 8.2 weight percent of the total composite glass material. As one of ordinary skill in the art would appreciate, the composite glass materials can include impurities and trace amounts of other materials. The composite glass material can include various combinations of the above listed materials at different amounts.

In some exemplary embodiments, the composite glass material comprises about 50 to about 85 weight percent of $SiO_2$, $Al_2O_3$, and $Fe_2O_3$; about 6 to about 28 weight percent of CaO; about 0.1 to 5 weight percent MgO; about 0.1 to about 2.5 weight percent $SO_3$; and a total alkali content between about 0.1 to about 18 weight percent.

In some exemplary embodiments, the composite glass material comprises about 50 to about 85 weight percent of $SiO_2$, $Al_2O_3$, and $Fe_2O_3$; about 15 to about 28 weight percent of CaO; about 2 to 5 weight percent MgO; about 0.1 to about 2.5 weight percent $SO_3$; and a total alkali content between about 0.1 to about 18 weight percent.

In some embodiments, the present invention comprises a method of making a composite glass material. In some embodiments, the method comprises providing a first glass material into a mixer; providing a fly ash material into the mixer; and co-milling the first glass material and the fly ash material to form a composite glass material.

In some embodiments, the first glass material and the fly ash material can be supplied to the mixer in a ratio of about 90 percent by weight of first glass material to about 10 percent by weight of the fly ash material. In other embodiments, the first glass material and the fly ash material can be supplied to the mixer in a ratio of about 50 percent by weight of first glass material to about 50 percent by weight of the fly ash material. In yet other embodiments, the first glass material and the fly ash material can be supplied to the mixer in a ratio of about 75 percent by weight of first glass material to about 25 percent by weight of the fly ash material. In some embodiments, the first glass material and the fly ash material can be supplied to the mixer in a range of ratios between about 9:1 to about 1:1 by weight, between about 4:1 to about 1:1 by weight, and between about 3:1 to about 2:1 by weight. In some embodiments, the first glass material and the fly ash material can be supplied to the mixer at a ratio of about 9:1 by weight, about 8:1 by weight, about 7:1 by weight, about 6:1 by weight, about 5:1 by weight, about 4:1 by weight, about 3:1 by weight, about 2:1 by weight, and about 1:1 by weight.

In some embodiments, the first glass material and the fly ash material can be supplied to the mixer in a ratio of about 10 percent by weight of first glass material to about 90 percent by weight of the fly ash material. In other embodiments, the first glass material and the fly ash material can be supplied to the mixer in a ratio of about 33 percent by weight of first glass material to about 67 percent by weight of the fly ash material. In yet other embodiments, the first glass material and the fly ash material can be supplied to the mixer in a ratio of about 25 percent by weight of first glass material to about 75 percent by weight of the fly ash material. In some embodiments, the fly ash material and the first glass material can be supplied to the mixer in a range of ratios between about 9:1 to about 1:1 by weight, between about 4:1 to about 1:1 by weight, and between about 3:1 to about 2:1 by weight. In some embodiments, the fly ash material and the first glass material can be supplied to the mixer at a ratio of about 9:1 by weight, about 8:1 by weight, about 7:1 by weight, about 6:1 by weight, about 5:1 by weight, about 4:1 by weight, about 3:1 by weight, and about 2:1 by weight.

In some embodiments, the present invention comprises a method of making a composite glass material. In some embodiments, the method comprises providing a first glass material; chopping the first glass material; providing a fly ash material; mixing the chopped first glass material with the fly ash material to provide a blend of the chopped first glass material and the fly ash material; and milling the blend of the chopped first glass material and the fly ash material to form a composite glass material.

In some embodiments, the first glass material can be sized or chopped (prior to introduction to a mixer or a co-milling operation) to have a particle size of greater than about 45 microns. In some embodiments, the first glass material can be sized or chopped to have a particle size of +325 mesh. In some embodiments, the first glass material can have a particle size of −1 inch mesh, and in some embodiments, a particle size of −¼ inch mesh. In some embodiments, the first glass material is at least one of E-glass, A-glass, C-glass, D-glass, S-glass, and ECR-glass compositions. In some embodiments, the first glass material is characterized as having an E-glass composition. In some embodiments, the first glass material is post-industrial waste glass.

In some embodiments, the fly ash material can have (prior to introduction to a mixer or a co-milling operation) a mean particle size range between of 12 microns and 150 microns.

In some embodiments, the fly ash material comprises by-products of burning coal in an electrical generating station. In some embodiments, the fly ash material can be classified as Class F, Class C, or Class N according to the specifications provided in ASTM C618.

In some embodiments, the method of making a composite glass material comprises making a composite glass material having between about 50 and about 85 weight percent $SiO_2$, $Al_2O_3$, and $Fe_2O_3$.

In some exemplary embodiments, the method of making a composite glass material comprises making a composite glass material having between about 50 to about 85 weight percent of $SiO_2$, $Al_2O_3$, and $Fe_2O_3$; about 6.0 to about 28 weight percent of CaO; about 0.5 to 5 weight percent MgO;

about 0.1 to about 2.5 weight percent $SO_3$; and a total alkali content between about 0.1 to about 18 weight percent.

In some embodiments, the method of making a composite glass material comprises making a composite glass material having between about 50 to about 85 weight percent of $SiO_2$, $Al_2O_3$, and $Fe_2O_3$; about 15 to about 28 weight percent of CaO; about 2 to 5 weight percent MgO; about 0.1 to about 2.5 weight percent $SO_3$; and a total alkali content between about 0.1 to about 2 weight percent.

In some embodiments in a concrete or cementitious application, the composite glass material can have any one or more of the following advantages: can be manufactured at a lower net manufacturing cost as compared to milled fiber glass; can provide better alkali silicate reaction performance than milled post-consumer bottled glass; can satisfy a greater filler volume in concrete over for example, metakaolins and other clays which results in a lower amount of cement in a concrete structure; and/or can provide superior workability over other pozzolans and cement alone.

C. A Fiberglass Material Co-Milled with a Clay Material

In some embodiments, the composite glass material comprises at least one of a natural clay material, for example, metakaolin. Metakaolin is a dehydroxylate form of the clay mineral kaolinite. Kaolinite is mined from high purity kaolin deposits or from kaolinite deposits or tropical soils of lower purity. It may also isolated from paper sludge waste or oil sand tailings. Metakaolin has a high water uptake in concrete hydration, which detracts from the workability of concrete blended with metakaolin. The co-milled metakaolin and glass composite reduces the water absorbing capacity of the concrete, resulting in improved workability of the concrete.

In some embodiments, the composite glass material can be used as a filler product for use in concrete or cement applications, industrial and paint filler applications, tiles and panel fillers, resin and material fillers, sealants and adhesives, and other uses.

Some embodiments of the present invention can be characterized by the total amount of clay product present in the composite glass material. In some embodiments, the composite glass material of the present invention can comprise between about 50 weight percent and about 85 weight percent metakaolin. The metakaolin can be present, in some embodiments, in an amount between about 40 weight percent to about 50 weight percent. In some embodiments, metakaolin can be present in an amount between about 50 weight percent to about 75 weight percent of the total composite glass material. In some embodiments, metakaolin can be present in an amount between about 25 weight percent to about 50 weight percent of the total composite glass material.

In some embodiments, the present invention comprises a method of making a composite glass material. In some embodiments, the method comprises providing a glass material into a mixer; providing a metakaolin material into the mixer; and co-milling the glass material and the metakaolin material to form a composite glass material.

In some embodiments, the glass material and the metakaolin material can be supplied to the mixer in a ratio of about 90 percent by weight of glass material to about 10 percent by weight of the metakaolin material. In other embodiments, the glass material and the metakaolin material can be supplied to the mixer in a ratio of about 50 percent by weight of glass material to about 50 percent by weight of the metakaolin material. In yet other embodiments, the glass material and the metakaolin material can be supplied to the mixer in a ratio of about 75 percent by weight of glass material to about 25 percent by weight of the metakaolin material. In some embodiments, the glass material and the metakaolin material can be supplied to the mixer in a range of ratios between about 9:1 to about 1:1 by weight, between about 4:1 to about 1:1 by weight, and between about 3:1 to about 2:1 by weight. In some embodiments, the glass material and the metakaolin material can be supplied to the mixer at a ratio of about 9:1 by weight, about 8:1 by weight, about 7:1 by weight, about 6:1 by weight, about 5:1 by weight, about 4:1 by weight, about 3:1 by weight, about 2:1 by weight, and about 1:1 by weight.

In some embodiments, the glass material and the metakaolin material can be supplied to the mixer in a ratio of about 10 percent by weight of glass material to about 90 percent by weight of the metakaolin material. In other embodiments, the glass material and the metakaolin material can be supplied to the mixer in a ratio of about 33 percent by weight of glass material to about 67 percent by weight of the metakaolin material. In yet other embodiments, the glass material and the metakaolin material can be supplied to the mixer in a ratio of about 25 percent by weight of glass material to about 75 percent by weight of the metakaolin material. In some embodiments, the metakaolin material and the glass material can be supplied to the mixer in a range of ratios between about 9:1 to about 1:1 by weight, between about 4:1 to about 1:1 by weight, and between about 3:1 to about 2:1 by weight. In some embodiments, the metakaolin material and the glass material can be supplied to the mixer at a ratio of about 9:1 by weight, about 8:1 by weight, about 7:1 by weight, about 6:1 by weight, about 5:1 by weight, about 4:1 by weight, about 3:1 by weight, and about 2:1 by weight.

In some embodiments, the present invention comprises a method of making a composite glass material. In some embodiments, the method comprises providing a glass material; chopping the glass material; providing a metakaolin material; mixing the chopped first glass material with the metakaolin material to provide a blend of the chopped glass material and the metakaolin material; and milling the blend of the chopped glass material and the metakaolin material to form a composite glass material.

In some embodiments, the glass material can be sized or chopped (prior to introduction to a mixer or a co-milling operation) to have a particle size of greater than about 45 microns. In some embodiments, the glass material can be sized or chopped to have a particle size of +325 mesh. In some embodiments, the glass material can have a particle size of −1 inch mesh, and in some embodiments, a particle size of −¼ inch mesh. In some embodiments, the glass material is at least one of E-glass, A-glass, C-glass, D-glass, S-glass, and ECR-glass compositions. In some embodiments, the glass material is characterized as having an E-glass composition. In some embodiments, the glass material is post-industrial waste glass.

In some embodiments, the metakaolin material can have (prior to introduction to a mixer or a co-milling operation) a mean particle size range between of 0.1 microns and 15 microns.

In some embodiments, the method of making a composite glass material comprises making a composite glass material having between about 50 and about 85 weight percent metakaolin. In some embodiments in a concrete or cementitious application, the composite milled glass material can have any one or more of the following advantages: can be manufactured at a lower net manufacturing cost as compared to milled fiber glass; can provide better chemical and/or erosion resistance; and/or can provide superior workability over other pozzolans and cement alone.

D. A Fiberglass Material Co-Milled with a Slag Material

In some embodiments, the composite glass material is made from at least one of a waste product of metal refining material, for example, a slag material. Slag is a glassy substance comprising Ca—Al—Mg silicates, and is by-product of metal smelting, such as iron smelting. The exact chemical composition of the slag varies depending on the raw materials used in the production process. For example, a granular slag is obtained when molten iron slag from a blast furnace is quenched with steam or water. The granular slag may be milled or otherwise ground to a fine powder that is called ground-granulated blast furnace glass (GGBS). In some embodiments, a slag material may be mixed or co-milled with downchute glass to produce a composite glass material. Concrete formulated with the composite glass material comprising slag has improved chemical and corrosion resistance compared to concrete formulated with slag alone.

Some embodiments of the present invention can be characterized by the total amount of slag product present in the composite glass material. In some embodiments, the composite glass material of the present invention can comprise between about 50 weight percent and about 85 weight percent slag. The slag can be present, in some embodiments, in an amount between about 40 weight percent to about 50 weight percent. In some embodiments, slag can be present in an amount between about 50 weight percent to about 75 weight percent of the total composite glass material. In some embodiments, slag can be present in an amount between about 25 weight percent to about 50 weight percent of the total composite glass material.

In some embodiments, the present invention comprises a method of making a composite glass material. In some embodiments, the method comprises providing a glass material into a mixer; providing a slag material into the mixer; and co-milling the glass material and the slag material to form a composite glass material.

In some embodiments, the glass material and the slag material can be supplied to the mixer in a ratio of about 90 percent by weight of glass material to about 10 percent by weight of the slag material. In other embodiments, the glass material and the slag material can be supplied to the mixer in a ratio of about 50 percent by weight of glass material to about 50 percent by weight of the slag material. In yet other embodiments, the glass material and the slag material can be supplied to the mixer in a ratio of about 75 percent by weight of glass material to about 25 percent by weight of the slag material. In some embodiments, the glass material and the slag material can be supplied to the mixer in a range of ratios between about 9:1 to about 1:1 by weight, between about 4:1 to about 1:1 by weight, and between about 3:1 to about 2:1 by weight. In some embodiments, the glass material and the slag material can be supplied to the mixer at a ratio of about 9:1 by weight, about 8:1 by weight, about 7:1 by weight, about 6:1 by weight, about 5:1 by weight, about 4:1 by weight, about 3:1 by weight, about 2:1 by weight, and about 1:1 by weight.

In some embodiments, the glass material and the slag material can be supplied to the mixer in a ratio of about 10 percent by weight of glass material to about 90 percent by weight of the slag material. In other embodiments, the glass material and the slag material can be supplied to the mixer in a ratio of about 33 percent by weight of glass material to about 67 percent by weight of the slag material. In yet other embodiments, the glass material and the slag material can be supplied to the mixer in a ratio of about 25 percent by weight of glass material to about 75 percent by weight of the slag material. In some embodiments, the slag material and the glass material can be supplied to the mixer in a range of ratios between about 9:1 to about 1:1 by weight, between about 4:1 to about 1:1 by weight, and between about 3:1 to about 2:1 by weight. In some embodiments, the slag material and the glass material can be supplied to the mixer at a ratio of about 9:1 by weight, about 8:1 by weight, about 7:1 by weight, about 6:1 by weight, about 5:1 by weight, about 4:1 by weight, about 3:1 by weight, and about 2:1 by weight.

In some embodiments, the present invention comprises a method of making a composite glass material. In some embodiments, the method comprises providing a glass material; chopping the glass material; providing a slag material; mixing the chopped first glass material with the slag material to provide a blend of the chopped glass material and the slag material; and milling the blend of the chopped glass material and the slag material to form a composite glass material.

In some embodiments, the glass material can be sized or chopped (prior to introduction to a mixer or a co-milling operation) to have a particle size of greater than about 45 microns. In some embodiments, the glass material can be sized or chopped to have a particle size of +325 mesh. In some embodiments, the glass material can have a particle size of −1 inch mesh, and in some embodiments, a particle size of −¼ inch mesh. In some embodiments, the glass material is at least one of E-glass, A-glass, C-glass, D-glass, S-glass, and ECR-glass compositions. In some embodiments, the glass material is characterized as having an E-glass composition. In some embodiments, the glass material is post-industrial waste glass.

In some embodiments, the slag material can have (prior to introduction to a mixer or a co-milling operation) a mean particle size range between of 0.1 microns and 15 microns. In some embodiments, the method of making a composite glass material comprises making a composite glass material having between about 50 and about 85 weight percent slag.

III. Downchute Glass Having Bimodal Particle Size with Second Material

In some embodiments, the fiberglass material having a bimodal particle size distribution may be co-milled with other filler materials such as post-consumer waste glass such as post-consumer glass waste, fly ash, clays such as metakaolin, and/or blast furnace slag to form a composite glass material.

In some embodiments, the fiberglass material having a bimodal particle size distribution may be mixed (specifically without co-milling) with a second material such as post-consumer waste glass such as post-consumer glass waste, fly ash, metakaolin, and/or blast furnace slag to form a filler material. In some embodiments, the glass material and the second material can be supplied to the mixer in a ratio of about 10 percent by weight of glass material to about 90 percent by weight of the slag material. In other embodiments, the glass material and the second material can be supplied to the mixer in a ratio of about 33 percent by weight of glass material to about 67 percent by weight of the second material. In yet other embodiments, the glass material and the second material can be supplied to the mixer in a ratio of about 25 percent by weight of glass material to about 75 percent by weight of the second material. In some embodiments, the second material and the glass material can be supplied to the mixer in a range of ratios between about 9:1 to about 1:1 by weight, between about 4:1 to about 1:1 by weight, and between about 3:1 to about 2:1 by weight. In some embodiments, the second material and the glass material can be supplied to the mixer at a ratio of about 9:1 by weight, about 8:1 by weight, about 7:1 by weight, about 6:1 by weight, about 5:1 by weight, about 4:1 by weight, about 3:1 by weight, and about 2:1 by weight.

IV. Downchute Glass Having Aspect Ratio with Second Material

In some embodiments, the fiberglass material having an aspect ratio of greater than 2 to 1 may be co-milled with other filler materials such as post-consumer waste glass such as post-consumer glass waste, fly ash, clays such as metakaolin, and/or blast furnace slag to form a composite glass material.

In some embodiments, the fiberglass material having an aspect ratio of greater than 2 to 1 may be mixed (specifically without co-milling) with other filler materials such as post-consumer waste glass such as post-consumer glass waste, fly ash, clays such as metakaolin, and/or blast furnace slag.

V. Applications of Fiberglass Materials and Composite Glass Materials

In some embodiments, the particulate fiberglass material having a bimodal distribution, the particulate fiberglass material having an aspect ratio of greater than 2 to 1 (collectively called "milled glass materials"), and the composite glass materials described above, can be utilized as a filler product for use in concrete or cement applications, industrial and paint filler applications, tiles and panel fillers, resin and material fillers, sealants and adhesives, and other uses.

In some embodiments, a cement composition comprises a particulate fiberglass material having a bimodal distribution. In some embodiments, an industrial and paint composition comprises a particulate fiberglass material having a bimodal distribution. In some embodiments, a resin filler composition comprises a particulate fiberglass material having a bimodal distribution. In some embodiments, an adhesive comprises a particulate fiberglass material having a bimodal distribution.

In some embodiments, a cement composition comprises a particulate fiberglass material having a bimodal distribution co-milled with at least one of post-consumer glass waste, fly ash, a natural clay such as metakaolin, and slag. In some embodiments, an industrial and paint composition comprises a particulate fiberglass material having a bimodal distribution co-milled with at least one of post-consumer glass waste, fly ash, a natural clay such as metakaolin, and slag. In some embodiments, a resin filler composition comprises a particulate fiberglass material having a bimodal distribution co-milled with at least one of post-consumer glass waste, fly ash, a natural clay such as metakaolin, and slag. In some embodiments, an adhesive comprises a particulate fiberglass material having a bimodal distribution co-milled with at least one of post-consumer glass waste, fly ash, a natural clay such as metakaolin, and slag.

In some embodiments, a cement composition comprises a particulate fiberglass material having an average aspect ratio of greater than about 2 to 1. In some embodiments, an industrial and paint composition comprises a particulate fiberglass material having an average aspect ratio of greater than about 2 to 1. In some embodiments, a resin filler composition comprises a particulate fiberglass material having an average aspect ratio of greater than about 2 to 1. In some embodiments, an adhesive comprises a particulate fiberglass having an average aspect ratio of greater than about 2 to 1.

In some embodiments, a cement composition comprises a particulate fiberglass material having an average aspect ratio of greater than about 2 to 1 co-milled with at least one of post-consumer glass waste, fly ash, a natural clay, and slag. In some embodiments, an industrial and paint composition comprises a particulate fiberglass material having an average aspect ratio of greater than about 2 to 1 co-milled with at least one of post-consumer glass waste, fly ash, a natural clay such as metakaolin, and slag. In some embodiments, a resin filler composition comprises a particulate fiberglass material having an average aspect ratio of greater than about 2 to 1 co-milled with at least one of post-consumer glass waste, fly ash, a natural clay such as metakaolin, and slag. In some embodiments, an adhesive comprises a particulate fiberglass material having an average aspect ratio of greater than about 2 to 1 co-milled with at least one of post-consumer glass waste, fly ash, a natural clay such as metakaolin, and slag.

In some embodiments, any suitable fiberglass material is co-milled with a second material. In some embodiments, the second material comprises at least one of post-consumer glass waste, fly ash, a natural clay such as metakaolin, and slag. In some embodiments, a cement composition comprises a fiberglass material co-milled with at least one of post-consumer glass waste, fly ash, a natural clay such as metakaolin, and slag. In some embodiments, an industrial and paint composition comprises a fiberglass co-milled with at least one of post-consumer glass waste, fly ash, a natural clay such as metakaolin, and slag. In some embodiments, a resin filler composition comprises a fiberglass material co-milled with at least one of post-consumer glass waste, fly ash, a natural clay such as metakaolin, and slag. In some embodiments, an adhesive comprises a fiberglass material co-milled with at least one of post-consumer glass waste, fly ash, a natural clay such as metakaolin, and slag.

In some embodiments, the fiberglass materials and/or composite glass materials can be used in a concrete or cementitious application. In some such embodiments, the fiberglass materials and/or composite glass materials can comprise about 5 to about 40 weight percent of a cement composition. The fiberglass materials and/or composite glass materials can be present, in some embodiments, in an amount between about 10 weight percent and 35 weight percent of a cement composition. In some embodiments, the fiberglass materials and/or composite glass materials can be present in an amount between about 10 weight percent and 30 weight percent of a cement composition. The cement composition using the fiberglass materials and/or composite glass materials can be manufactured using unit operations known to those of ordinary skill in the art.

In some embodiments, the fiberglass materials and/or composite glass materials can be used in an industrial or paint filler application. In some such embodiments, the fiberglass materials and/or composite glass materials can comprise about 5 to about 40 weight percent or about 5 to about 30 weight percent of an industrial or paint filler. The fiberglass materials and/or composite glass materials can be present, in some embodiments, in an amount between about 7 weight percent and 30 weight percent of an industrial or paint filler. In some embodiments, the fiberglass materials and/or composite glass materials can be present in an amount between about 10 weight percent and 20 weight percent of an industrial or paint filler. The industrial or paint fillers using the fiberglass materials and/or composite glass materials can be manufactured using unit operations known to those of ordinary skill in the art.

In some embodiments, the fiberglass materials and/or composite glass materials can be used in a tile or panel application. In some such embodiments, the fiberglass materials and/or composite glass materials can comprise about 0.5 to about 20.0 weight percent of a tile or panel filler. The fiberglass materials and/or composite glass materials can be present, in some embodiments, in an amount between about 0.5 weight percent and 30.0 weight percent of a tile or panel filler. In some embodiments, the fiberglass materials and/or composite glass materials can be present in an amount between about 10.0 weight percent and 40.0 weight percent of a tile or panel filler. The tile or panel fillers using the fiberglass materials and/or composite glass materials can be manufactured using unit operations known to those of ordinary skill in the art.

In some embodiments, the fiberglass materials and/or composite glass materials can be used in a resin and material filler application. In some such embodiments, the fiberglass materials and/or composite glass materials can comprise about 5.0 to about 20.0 weight percent of a resin and material filler. The fiberglass materials and/or composite glass materials can be present, in some embodiments, in an amount between about 5.0 weight percent and 30.0 weight percent of a resin and material filler. The resin and material fillers using the fiberglass materials and/or composite glass materials can be manufactured using unit operations known to those of ordinary skill in the art.

In some embodiments, the fiberglass materials and/or composite glass materials can be used in a sealant or adhesive application. In some such embodiments, the fiberglass materials and/or composite glass materials can comprise about 2.0 to about 15.0 weight percent of a sealant or adhesive filler. The fiberglass materials and/or composite glass materials can be present, in some embodiments, in an amount between about 1.0 weight percent and 20.0 weight percent of a sealant or adhesive filler. In some embodiments, the fiberglass materials and/or composite glass materials can be present in an amount between about 5.0 weight percent and 30.0 weight percent of a sealant or adhesive filler. The sealant and adhesive filler using the fiberglass materials and/or composite glass materials can be manufactured using unit operations.

In certain aspects of the present invention, fiberglass materials and/or composite glass materials can be used in industrial and paint-filler applications. In some such applications, fiberglass materials and/or composite glass materials can provide equivalent or improved properties as compared to conventional fillers, such as, for example, consistent chemistry of the filler, consistent color, higher flattening efficiency, improved refractive index, or thermal stability within a crystalline silica free product. In some embodiments, fiberglass materials and/or composite glass materials can be manufactured at lower cost. In some embodiments in industrial or paint filler application, fiberglass materials and/or composite glass materials can provide capacity for LEED credits and points by use of at least one post-industrial waste or by-product.

Example 1: Particulate Fiberglass Materials

Non-limiting embodiments of particulate fiberglass materials were prepared according to some embodiments of the present invention. In one example, the particulate fiberglass materials were made from TEXO treated E-glass fibers and were analyzed to determine particle size of the material. The particulate fiberglass material was analyzed using a FEI Quanta 250 FEG-SEM with a 20 KV accelerating voltage and spot size 3. Images were collected at 1,000× to capture the distribution of the larger particles and 10,000× to capture the distribution of the smaller particles. The average particle size is 5.38 μm±5.22 μm. FIG. 1 shows the distribution of 150 measurements. FIG. 2 shows an SEM image at 1,000× magnification. FIG. 3 shows an SEM image at 10,000× magnification.

Other non-limiting embodiments of particulate fiberglass materials having a bimodal particle size distribution were prepared according to some embodiments of the present invention. FIG. 4 shows the distribution of a particle size analysis of particulate fiberglass materials having a bimodal particle size distribution prepared according to methods of embodiments of the present invention. The first peak shown in FIG. 4 is about 1.987 μm, and the second peak shown in FIG. 4 is about 8.06 μm. The aspect ratio of exemplary particles of such particulate fiberglass material was calculated. Table 1 provides the results of measurements of the particles:

TABLE 1

| Measured Particles | | | |
|---|---|---|---|
| Particle # | Length (μm) | Width (μm) | Calculated Aspect Ratio |
| 1 | 29.02 | 3.00 | 9.67 |
| 2 | 26.63 | 3.00 | 8.88 |
| 3 | 46.17 | 4.12 | 11.21 |
| 4 | 52.55 | 3.16 | 16.63 |
| 5 | 36.35 | 3.61 | 10.07 |
| 6 | 59.91 | 3.16 | 18.96 |
| 7 | 37.48 | 1.41 | 26.58 |
| 8 | 69.53 | 2.24 | 31.04 |
| 9 | 32.02 | 2.83 | 11.31 |
| 10 | 26.02 | 3.00 | 8.67 |
| 11 | 28.79 | 2.24 | 12.85 |
| 12 | 48.01 | 3.16 | 15.19 |
| 13 | 33.42 | 2.83 | 11.81 |
| 14 | 41.00 | 3.16 | 12.97 |
| 15 | 50.33 | 2.24 | 22.47 |
| 16 | 37.01 | 4.24 | 8.73 |
| 17 | 34.44 | 4.24 | 8.12 |
| 18 | 40.50 | 2.00 | 20.25 |
| 19 | 39.05 | 3.16 | 12.36 |
| 20 | 56.86 | 4.24 | 13.41 |

Other non-limiting embodiments of particulate fiberglass materials having a bimodal particle size distribution were prepared according to some methods of the present invention. FIG. 5 shows the distribution of a particle size analysis of particulate fiberglass materials having a bimodal particle size distribution prepared according to methods of embodiments of the present invention.

Example 2: Composite Glass Materials

Non-limiting embodiments of composite glass materials were prepared according to some embodiments of the present invention. In one example, the particulate fiberglass materials were made from TEXO treated E-glass fibers composite glass materials were prepared by co-milling with a second material according to Table 2, with the two comparative examples containing 100% fly ash from two different sources. Inductively Coupled Plasma Optical Emission Spectroscopy (ICP-OES) was used to determine the relative oxides content of the samples, as shown in Table 3. In some cases, using post-consumer glass waste as the second material results in a composite glass material having a $Na_2O$ content of greater than 2 weight percent, based on the weight of the composite glass material. In some cases, using fly ash as the second material results in a composite glass material having a $Fe_2O_3$ content of greater than 2 weight percent, based on the weight of the composite glass material.

TABLE 2

Sample Composition

| Sample: | E glass (wt %) | Bottle Glass (wt %) | Fly Ash (wt %) |
|---|---|---|---|
| 1 | 85 | 15 | |
| 2 | 90 | | 10 |
| 3 | 50 | | 50 |
| Comparative 1 | | | 100 |
| Comparative 2 | | | 100 |

TABLE 3

Oxides Content

| Sample: | Al$_2$O$_3$ (wt %) | Fe$_2$O$_3$ (wt %) | Na$_2$O (wt %) | SiO$_2$ (wt %) |
|---|---|---|---|---|
| 1 | na[1] | na | 3.14, 3.21 | na |
| 2 | 13.0, 12.8 | 0.944, 0.937 | na | 53.5, 54.3 |
| 3 | 16.6, 16.1 | 3.59, 3.46 | na | 52.0, 51.5 |
| Comp. 1 | 16.4, 16.1 | 11.4, 11.3 | na | 48.1, 47.5 |
| Comp. 2 | 18.3, 17.6 | 10.9, 11.2 | na | 43.2, 41.7 |

[1]Not measured.

It is to be understood that the present description illustrates aspects of the various embodiments of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention.

That which is claimed:

1. A composite glass material comprising:
   Na$_2$O about 2.1 to about 8.2 weight percent;
   SiO$_2$ 55 to 70 weight percent;
   Al$_2$O$_3$ 5 to 11 weight percent;
   CaO 15 to 20 weight percent;
   MgO 1 to 3 weight percent; and
   K$_2$O less than about 0.2 weight percent.

2. The composite glass material of claim 1 further comprising:
   Fe$_2$O$_3$ less than about 0.3 weight percent;
   Cr$_2$O$_3$ less than about 0.01 weight percent
   TiO$_2$ less than about 0.6 weight percent;
   SO$_3$ less than about 0.1 weight percent;
   B$_2$O$_3$ 0.5 to 2.0 weight percent;
   SrO less than about 0.3 weight percent;
   BaO less than about 0.2 weight percent; and
   ZrO$_2$ less than about 0.03 weight percent.

3. A composite glass material comprising:
   SiO$_2$, Al$_2$O$_3$, and Fe$_2$O$_3$, wherein the total amount of SiO$_2$, Al$_2$O$_3$, and Fe$_2$O$_3$ in the composite glass material is between about 50 weight percent to about 85 weight percent of the total composite glass material;
   Cao in an amount of about 6 to about 28 weight percent of the total composite glass material;
   MgO in an amount of about 0.5 to about 5 weight percent of the total composite glass material;
   SO$_3$ in an amount of about 0.1 weight percent to about 2.5 weight percent of the total composite glass material; and,
   an alkali content between about 0.1 weight percent to about 18 weight percent of the total composite glass material.

4. A method of making a composite glass material comprising:
   providing a first glass material to a mixer;
   providing a second material to the mixer; and
   co-milling the first glass material and a second material to form a composite glass material wherein the composite glass material comprises:
   Na$_2$O about 2.1 to about 8.2 weight percent
   SiO$_2$ 55 to 70 weight percent;
   Al$_2$O$_3$ 5 to 11 weight percent;
   CaO 15 to 20 weight percent;
   MgO 1 to 3 weight percent; and
   K$_2$O less than about 0.2 weight percent.

5. The method of claim 4, wherein the second material comprises at least one of post-consumer glass waste, fly ash, metakaolin, and slag.

6. The method of claim 4, wherein the second material comprises post-consumer waste glass.

7. The method of claim 4, wherein the second material comprises at least one of soda lime glass, float glass, plate glass, and flat glass.

8. The method of claim 4, wherein the composite glass material further comprises:
   Fe$_2$O$_3$ less than about 0.3 weight percent;
   Cr$_2$O$_3$ less than about 0.01 weight percent
   TiO$_2$ less than about 0.6 weight percent;
   SO$_3$ less than about 0.1 weight percent;
   B$_2$O$_3$ 0.5 to 2.0 weight percent;
   SrO less than about 0.3 weight percent;
   BaO less than about 0.2 weight percent; and
   ZrO$_2$ less than about 0.03 weight percent.

9. The method of claim 4, wherein the composite glass material comprises SiO$_2$, Al$_2$O$_3$, and Fe$_2$O$_3$, wherein the total amount of SiO$_2$, Al$_2$O$_3$, and Fe$_2$O$_3$ is between about 50 weight percent to about 85 weight percent of the total composite glass material.

* * * * *